United States Patent [19] [11] Patent Number: 4,789,986
Koizumi et al. [45] Date of Patent: Dec. 6, 1988

[54] METHOD FOR CHECKING CONSISTENCY OF DISTRIBUTED DATA

[75] Inventors: Minoru Koizumi; Kinji Mori, both of Yokohama; Yasuo Suzuki, Ebina; Katsumi Kawano, Fuchu; Masayuki Orimo, Machida; Hirokazu Kasashima, Hitachi; Kozo Nakai, Katsuta, all of Japan

[73] Assignee: Hitachi, Ltd., Tokyo, Japan

[21] Appl. No.: 895,218

[22] Filed: Aug. 11, 1986

[30] Foreign Application Priority Data

Aug. 28, 1985 [JP] Japan ............................. 60-189158

[51] Int. Cl.$^4$ .......................................... G06F 11/00
[52] U.S. Cl. ........................................ 371/67; 371/22
[58] Field of Search ............ 371/67, 69, 36, 22, 371/7; 240/825.16, 825.05; 364/200 MS File, 900 MS File; 370/86

[56] References Cited

U.S. PATENT DOCUMENTS 4,477,881 10/1984 Kobayashi ....................... 364/900
4,558,428 12/1985 Matshura ........................ 370/86 X
4,606,729 8/1986 Nagao ............................... 371/69

Primary Examiner—Jerry Smith
Assistant Examiner—Robert W. Beausoliel
Attorney, Agent, or Firm—Antonelli, Terry & Wands

[57] ABSTRACT

In a method for checking consistency of distributed data in which data distributedly stored in a plurality of devices connected to a common data transmission line are sequentially combined, each device sends out to the data transmission line output data accompanied with information indicating a position of a processed result in the output data, and the device which receives redundant data compares collected redundant data to select a correct data by comparing only the portion of the data which was lastly added in accordance with the information accompanying the data.

6 Claims, 12 Drawing Sheets

FIG. 4

| FC | RQN | DVN | RFC | RDT ST | RDT ED | CFLG | D | L |
|----|-----|-----|-----|--------|--------|------|---|---|
| 601 | 602 | 603 | 604 | 605 | 606 | 607 | 608 | 609 |

FIG. 5

| $FC_{abc}$ | $N_{abc}$ | 11 | $FC_s$ | φ | φ | φ | L |
|---|---|---|---|---|---|---|---|

FIG. 6

| F | FC | SA | DN | RQN | DVN | RFC | RDT ST | RDT ED | CFLG | D | L | F |
|---|----|----|----|----|----|----|----|----|----|---|---|---|
| 700 | 701 | 702 | 703 | 704 | 705 | 706 | 707 | 708 | 709 | 710 | 711 | 712 |

FIG. 9

| COLLECTION FLAG | FC | RQN | DVN | COLLECTION START TIME | DATA COUNTER | DATA STORAGE AREA | DATA COUNTER | DATA STORAGE AREA | ... | DATA COUNTER | DATA STORAGE AREA |
|---|---|---|---|---|---|---|---|---|---|---|---|
| 5101 | 5102 | 5103 | 5104 | 5105 | 5111 | 5121 | 5112 | 5122 | ... | 511m | 512m |
| | | | | | | | | | | | |
| | | ... | ... | ... | | | | | | ... | |
| | | | | | | | | | | | |

| FC_vf | RQN | DVN | RFC | RDT ST | RDT ED | CFLG | VOTING ERROR | F |

FIG. 13

| CONTENT CODE | CONTENT CODE OF SELF-CONNECTION DATA | LEFT END CONNECTION INFORMATION | EDITION END FLAG |
|---|---|---|---|
| FC | $FC_i$ | LFC | CFLG |
| ..... | ..... | ..... | ..... |

| DEVICE NO. | 11 | 12 | 13 | 14 | 15 | 16 | 1n |
|---|---|---|---|---|---|---|---|
| FC | | | | | | $FC_{abc}$ | |
| RFC | | | | | | $FC_b$ | |

FIG. 16

| DEVICE NO. | CONTENT CODE | SELF-CONNECTION DATA CONTENT CODE | LEFT END CONNECTION INFORMATION | EDITION END FLAG |
|---|---|---|---|---|
| 12 | $FC_{abc}$ | $FC_a$ | $FC_s$ | 0 |
| 13 | $FC_{abc}$ | $FC_b$ | $FC_a$ | 0 |
| 14 | $FC_{abc}$ | $FC_b$ | $FC_a$ | 0 |
| 15 | $FC_{abc}$ | $FC_b$ | $FC_a$ | 0 |
| 16 | $FC_{abc}$ | $FC_c$ | $FC_b$ | 1 |

METHOD FOR CHECKING CONSISTENCY OF DISTRIBUTED DATA

BACKGROUND OF THE INVENTION

The present invention relates to a method for checking consistency of distributed data by detecting and eliminating inconsistent data in a system in which a plurality of devices connected to a common data transmission line process data cooperatively.

In Japanese Patent Unexamined Publication No. 57-97173, a plurality of devices connected to a common data transmission line sequentially edit and add distributed files by connecting files which the devices for a request to edit the distributed files. In this system, if a file is stored in duplicate in a plurality of devices in order to improve reliability of the file edition, redundant edit data is generated for a request for file edition. When the devices sequentially edit the data, each device selects correct data from the redundant edit data to add the selected data to the file of the device so that the reliability of the distributed file edition is improved.

On the other hand, in Japanese Patent Unexamined Publication No. 57-175238, a method to select correct data from redundant data is disclosed. In this method, a device which receives the redundant data collects data for a predetermined time period, compares the data contents and selects the correct data by majority logic. By applying this method to the distributed file edition system described above, the reliability of the distributed file edition is improved by storing the files in duplicate in the plurality of devices.

However, if such distributed files are sequentially edited, the size of the edited data sequentially increases. Accordingly, when the device selects the correct data from the redundant edit data by comparing the data contents as disclosed in the Japanese Unexamined Publication No. 57-175238, the data to be compared is larger, the compare time is longer and the load is heavier.

SUMMARY OF THE INVENTION

It is an object of the present invention to provide a method for checking consistency of distributed data which resolves the problems encountered in the prior art method and which allows selection of correct data from redundant data generated by cooperative processing by a plurality of devices, without increasing a compare time, notwithstanding a sequential increase of data length.

In order to achieve the above object, in the method for checking the consistency of the distributed data of the present invention in which files distributedly stored in memories of a plurality of devices connected to a common data transmission line are sequentially added to data flowing over the transmission line in accordance with edit information which the devices have, each of the devices, if file data to be added are in duplicate, collects the duplicate file data, compares them, selects the correct data and adds the selected data to the file which the device has.

BRIEF DESCRIPTION OF THE DRAWINGS

FIG. 4 shows a format of file edit data, FIG. 5 shows a format of file edit initial data, FIG. 6 shows a format of a file edit message, FIG. 11 shows a format of a voting error message, FIG. 13 shows a format of an edit connection information table in a memory unit for edition in the device, FIGS. 14(a) to 14(f) show formats of data of file edit messages sent from the devices, and, FIGS. 15, 16 and 17(a), (b) and (c) show status of the consistency check data registration table, edit connection information table and consistency check work area of the device, respectively.

DESCRIPTION OF THE PREFERRED EMBODIMENTS

One embodiment of the present invention is now explained with reference to the drawings. In the present embodiment, distributed file edition is described to explain the data consistency check method of the present invention.

Figure 1:
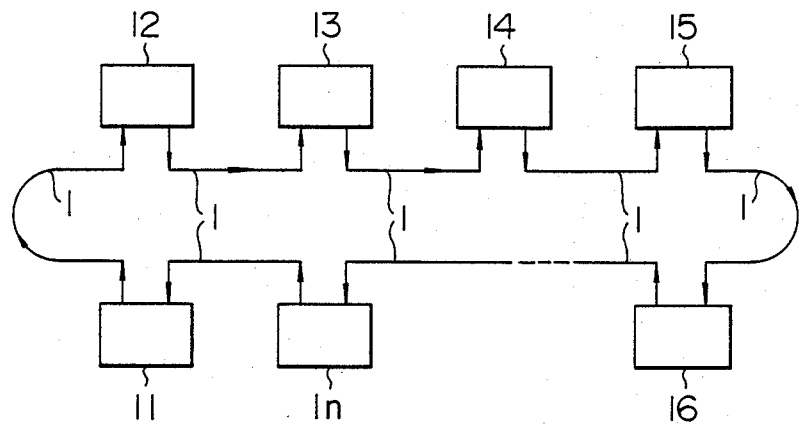
FIG. 1 shows an overall configuration of a system having a loop transmission system and n devices connected thereto, to which the present invention is applied.

FIG. 1 shows an overall configuration of a system having a common data transmission line and devices connected thereto, to which the present invention is applied. A unidirectional loop transmission line is used as the common data transmission line to which n devices 11, 12, . . . 1n are connected.

Figure 2:
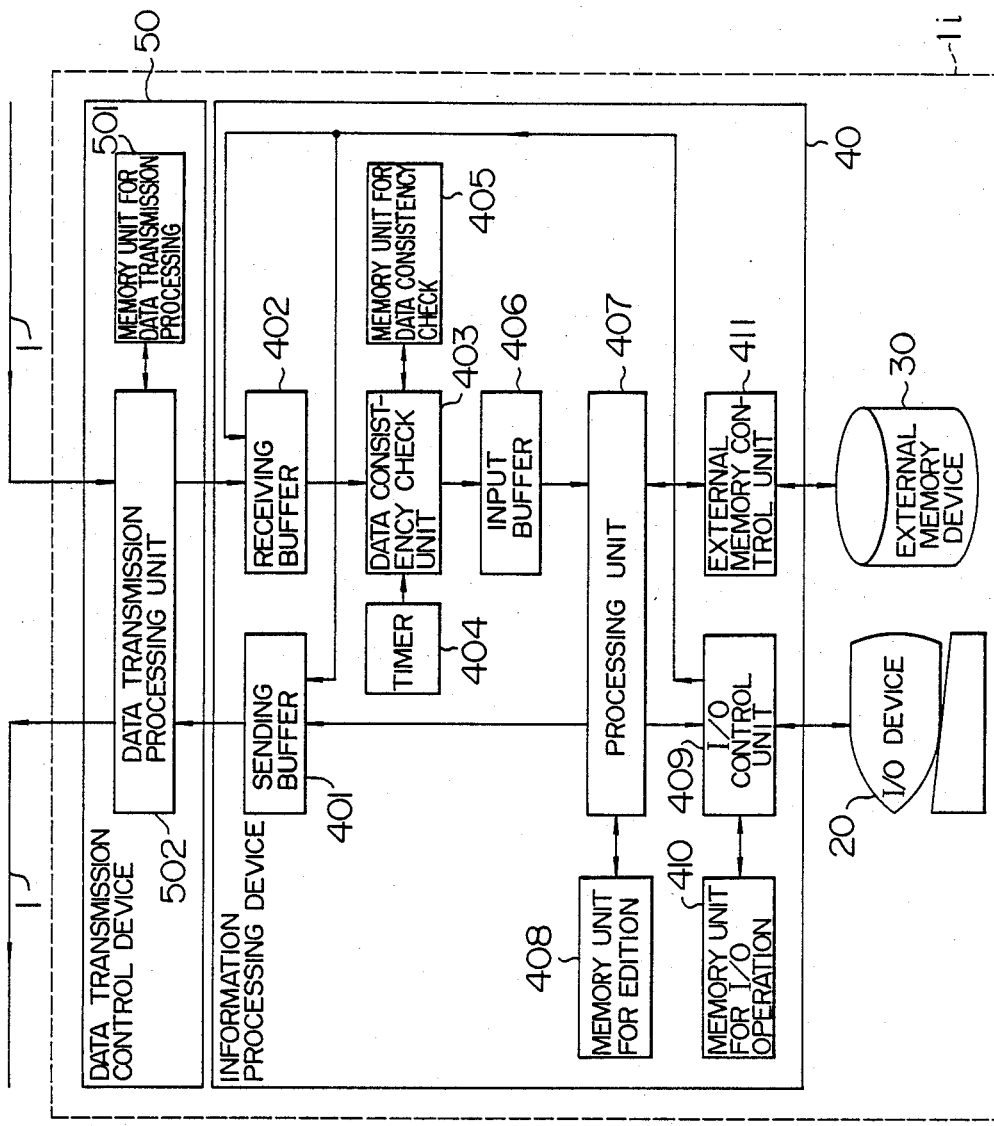
FIG. 2 shows a block diagram of a device in accordance with one embodiment of the present invention.

FIG. 2 is a block diagram of the device in accordance with one embodiment of the present invention.

As shown in FIG. 2, the i-th device 1i comprises an I/O device 20 for receiving a file edit request from a keyboard and outputting an edited result, an external memory device 30 for storing files to be edited, an information processing device 40 for retrieving, comparing and editing data and a transmission control device 50 for coupling the information processing device 40 to the unidirectional loop transmission line 1 of FIG. 2. The information processing device 40 comprises a sending buffer 401 for sending file edit data to other devices, a receiving buffer 402 for receiving file edit data from other devices, a data consistency check unit 403 for collecting redundant data and selecting correct data from the redundant data, a timer 404 for comparing data collection time with current time to detect the elapse of data collection time period, a memory unit for data consistency check 405 for storing data to be checked for consistency, an input buffer 406 for receiving file edit data checked for consistency, a processing unit 407 for editing the data supplied from other devices and data stored in its own file, a memory unit for edition 408 for storing data to be used in editing the files, an I/O control unit 409 for controlling I/O operations of the file edit data, an I/O memory unit 410 for storing data to be used in the I/O control and an external memory control unit 411 for controlling the file data of the external memory device 30. The transmission control device 50 comprises a memory unit for data transmission processing 501 and a data transmission processing unit 502 for transmitting the file edit data.

In the present embodiment, each of the devices distributedly checks the data consistency by a content code protocol, and when the device receives a file edit request from a keyboard of its I/O device, the device broadcasts to all devices including itself only the content code representing the content of the requested edition. The devices which receive the broadcast content code determine whether the file edition relate to themselves by checking whether the content code has been registered therein.

The data consistency check method of the present invention is explained for the edition of the distributed files in (i) file edit request accept processing, (ii) data transmission, (iii) data consistency check, (iv) edition, and edited data output processing.

(i) File edit request accept processing

Let us assume that a file edit request has been issued by a key input from the I/O device 20 in the device 11. The key input is received by the I/O control unit 409 in the information processing device 40.

Figure 3:
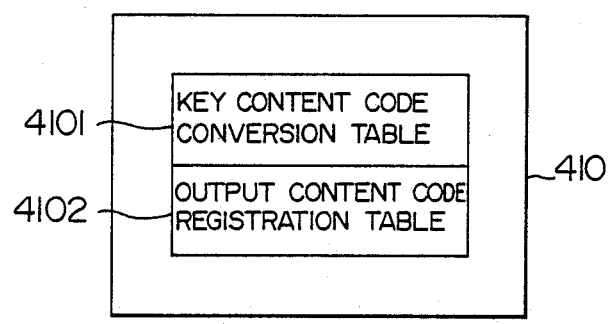
FIG. 3 shows a configuration of an I/O memory unit of FIG. 1.

FIG. 3 shows a configuration of the I/O memory unit 410. As shown in FIG. 3, the I/O memory unit 410 comprises a key content code conversion table 4101 and an output content code registration table 4102. The I/O control unit 409 looks up the key content code conversion table 4101 to select the content code of the file edition designated by the key input. In the present embodiment, it is assumed that the selected content code is FC abc which corresponds to the edition of files A, B and C of content codes FCa, FCb and FCc. The edition is performed in the order of the files A, B and C, and the files A and C are stored in the external memory devices 30 of the devices 12 and 16, respectively, and the file B is stored in duplicate in the external memory devices 30 of the devices 13, 14 and 15.

FIG. 4 shows a format of the file edit data in the present invention. FIG. 5 shows a format of a file edit initial data in the present invention. The I/O control unit 409 initializes the file edit data as shown in FIG. 5 (which is herein called the file edit initial data) by using the selected content code FC in accordance with the file edit data format shown in FIG. 4. In FIG. 4, a field 601 contains the content code FC which represents the content of the file edition, a field 602 contains a serial number of the data from the I/O device 20, a field 603 contains a device number, and fields 604, 605, 606 and 607 are control information fields of the processing unit 407 of the devices. The field 604 contains a right end content code RFC which represents the content code of the data connected to the right end of the edit data set in a field 608, the fields 605 and 606 contain a start address RDTST and an end address RDTED (where addresses are relative addresses in the data D) of the data connected to the right end of the data D, and the field 607 contains an edit end flag CFLG for indicating whether the data D set in the field 608 has been edited or not. A field 609 contains a marker L indicating the end of the data. In the present embodiment, as shown in FIG. 5, FCabc is set in the content code field 601 of the file edit initial data. Since the data has not yet been set in the edit data field, the content code FCs indicating "vacant" is set in the right end content code field 601, and "0"s are set in the right end data start address field 605, end address field 606 and edit end flag 607 Nabc is set in the data serial number field 602 and "11" is set in the device number field 603. No data is written in the edit data field 608. The right end content code of the file edit initial data and the setting of the edit end flags do not change depending on the content of the file edition.

The I/O control unit 409 transfers the file edit initial data to the sending buffer 401 and the receiving buffer 402 in the information processing device 40 to supply them to processing queues of the data transmission control device 50 and the data consistency check unit 403, respectively.

After the above file edit request accept processing, the data transmission is performed.

(ii) Data transmission

Each of the data transmission control devices 50 in the devices 11, 12, ..., 1n reads out the file edit data in the data transmission buffer 401 in the information processing device 40 (the file edit initial data supplied from the I/O control unit 409 and the file edit data supplied from the processing unit 407), one data at a time, prepares a file edit message based on the data and sends it out to the loop transmission line 1. FIG. 6 shows a format of the file edit message. Fields 700 and 712 in FIG. 6 contain flags F indicating the start and the end of the message, a field 701 contains the content code of the file edition, a field 702 contains a device address SA of a message source, a field 703 contains a serial number DN of the sending message, and fields 704 to 711 contain RQN, DVN, RFC, RDTST, RDTED, CFLG, D and L of the file edit data shown in FIG. 4, respectively.

For the message sent out to the loop data transmission line 1, the data transmission control devices 50 of the devices 11, 12, ..., 1n receive the message in the following manner. The device checks if the file edit message received from the loop transmission line 1 is the message which it sent by the SA in the field 702 (FIG. 6) of the message, and if it is the message which the device itself sent, the device stops the transfer to other devices and erases the message. If it is not the message which the device itself sent, the device transfers the message to other devices and compares the content code of the message with the content code registered in the memory unit 501 for data transmission in the data transmission control device 50 in order to determine whether the file edit message relates to the file edition to which the device itself concerns. If there is no matching content code, the message is erased. If there is a matching code, FC, RQN, DVN, RFC, RDTST, RDTED, CFLG, D and L of the message are read out and they are reformatted into the file edit data of the format shown in FIG. 4 and the formatted data is transferred to the receiving buffer 402 in the information processing device 40. The serial number DN is used to check whether the message has been circulated or not, and if it has not been circulated, the message is retransmitted. The serial number is also used in the receiving device to prevent reception of duplicate messages.

In the present embodiment, since the devices 12, 13, 14, 15 and 16 pertain to the file edition, FCabc has been registered in the memory unit 501 for data transmission in each of the data transmission control devices 50. Accordingly, the message sent from the device 11 after the file edit request accept processing is received by the devices 12, 13, 14, 15 and 16, reformatted into the file edit data shown in FIG. 4 and they are supplied to queues of the receiving buffer 402 in the information processing devices 40.

(iii) Data consistency check

Figures 7, 8:
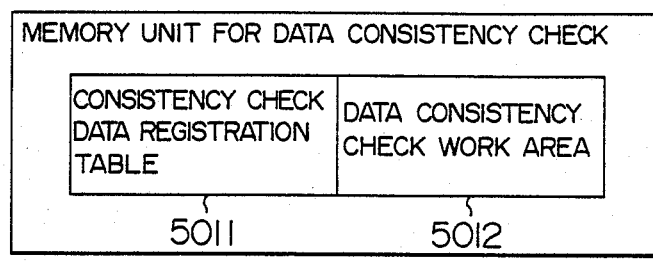
FIG. 7 shows a configuration of a memory unit for data consistency check of FIG. 1, FIGS. 8 and 9 show a consistency check data registration table and a consistency check work area in the memory unit for data consistency check.
Figure 10A:
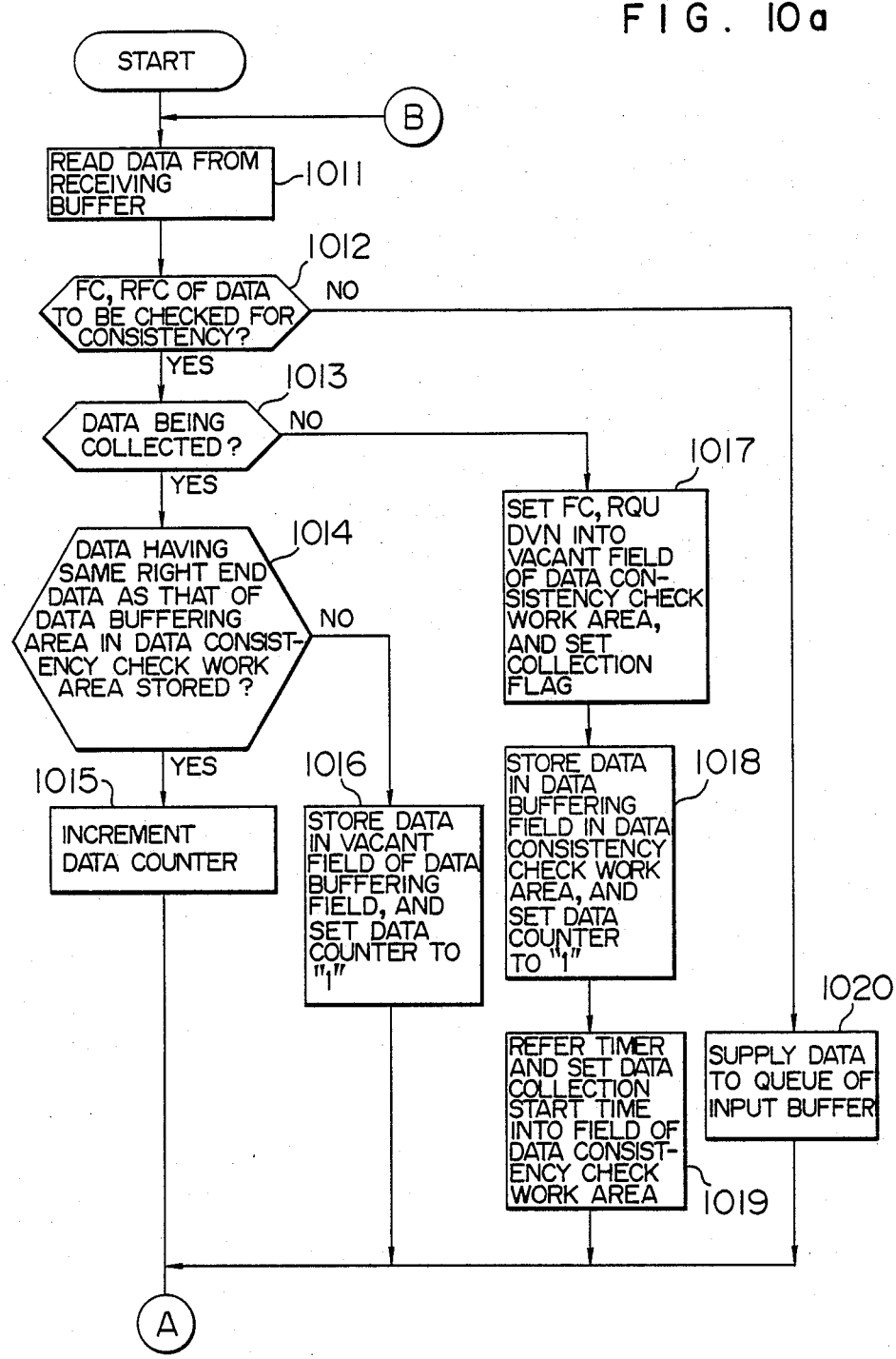
FIG. 10(a) and 10(b) show a flow chart of a data consistency check unit of the present invention.
Figure 10B:
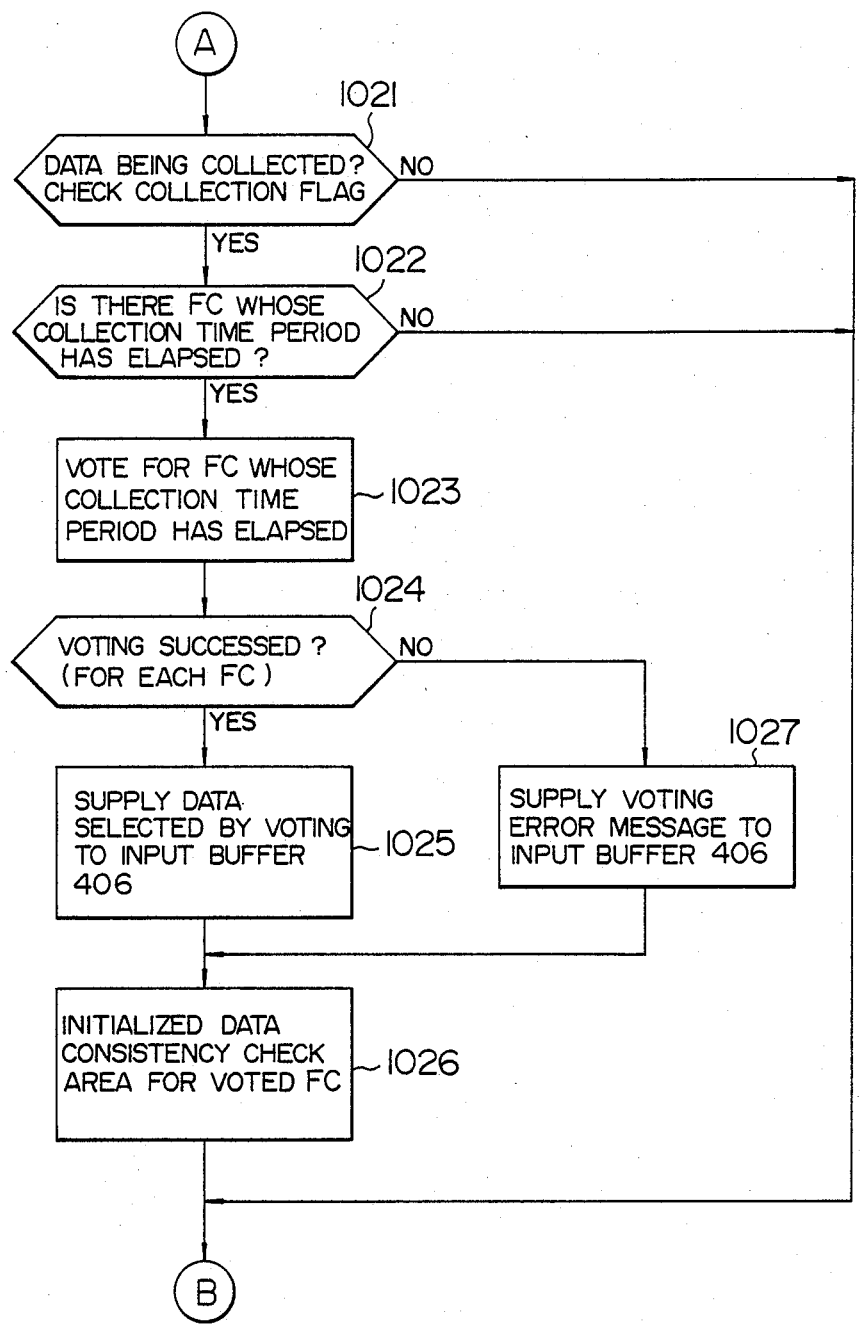

Each of the data consistency check units 403 in the devices 11, 12, 13, . . . , 1n reads one data from the receiving buffer 402 to check the data consistency. FIG. 10 shows a flow chart of the data consistency check unit 403 of the present invention. The data consistency check is explained with reference to FIG. 10. In the data consistency check, one correct data is selected from redundant data. It comprises a step for collecting the redundant data and a step for selecting the correct data from the collected data. FIG. 7 shows a configuration of the memory unit 405 for data consistency check. The step for collecting the redundant data and the step for selecting the correct data are now explained.

The data is read out of the receiving buffer 402 (step 1011). The read data is referred to as received data. Whether both FC and RFC of the received data have been registered in the consistency check data registration table 5011 in the memory unit 405 for data consistency is check (step 1012). As shown in FIG. 8, FC and RFC of the data to be checked for consistency have been registered in the consistency check data registration table 5011. If FC and RFC of the received data are not those to be checked for consistency, the received data is supplied to the queue of the input buffer 406 of the processing unit 407 (step 1020). If FC and RFC of the received data are those to be checked for consistency, whether the received data is one for which the collection has been started or not by referencing the data consistency check work area 5012 in the memory unit 405 for data consistency check (step 1013). A configuration of the data consistency check work area 5012 is shown in FIG. 9. The data consistency check work area 5012 collects the data to be checked for consistency, for a predetermined time period. The field 5102 to 5104 contain FC, RQN and DVN of the collected data.

The field 5101 contains a collection flag indicating that the data identified by the fields 5102 to 5104 are being collected. Fields 5121, 5122, . . . , 512m contain the collected data sorted by their contents, and fields 5111, 5112, . . . , 511m contain the number of collected data of the same content. If one of FC, RQN and DVN is different between two data, they are collected in the different fields. The data is identified not by FC alone but by the combination of FC, RQN and DVN in order to allow edition of file for each of the file edit requests of the same content sequentially issued from a plurality of devices.

In the step 1013, whether {FC, RQN, DVN} of the received data completely match to {FC, RQN, DVN} of a certain line having the collection flag 5101 set, in the data consistency check work area 5012 or not is checked to determine whether the received data is one for which the collection has been started. If it is the data being collected, the fields 5121, 5122, . . . , 512m are referenced to determine whether the data having the right end data identified by RDTST and RDTED has been stored or not (step 1014). If there is a data having the same right end data, the data counter of that field is incremented (step 1015). If there is no data having the same right end data, a vacant field (a line having "0" data counter) is selected from the fields 5121~512m, the received data is stored therein and the data counter is incremented from "0" to "1" (step 1016).

In the step 1013, if the received data is not the data being collected, FC, RQN and DVN of the data are stored in the vacant field (line having "0" collection flag 5101) in the data consistency check work area 5012 (step 1017), the received data is stored in the data storage field 5121, and "1" is set in the data counter 5111 (step 1018). The timer 404 in the information processing device 40 is referenced and the collection start time is set in the field 5105 (step 1019).

Then, one correct data is selected from the collected data for {FC, RQN, DVN} of the data whose collection time has expired (voting) and the data is stored in the input buffer 406 in the information processing device 40. The voting is now explained in detail. The collection flag 5101 of the data consistency check work area 5012 is referenced to check whether the data is being collected or not (step 1021). If it is not being collected, the process returns to the step 1011. If it is being collected, the collection time is compared with the current time of the timer 404 for each {FC, RQN, DVN} of the data being collected to check whether the collection time period has elapsed or not (step 1022). The collection time period has been predetermined. If there is no combination of {FC, RQN, DVN} whose collection time period has elapsed, the process returns to the step 1011. If there is such a combination, majority one of the collected data is selected (step 1023). Summation of the data counters 5111~511m is calculated, and the data stored at the storage area of the data counter which shows the majority is selected. If there is such majority data (step 1024), it means that the voting was successful and the data is supplied to the queue of the input buffer 406 (step 1025). If there is no such majority data, it means that the voting failed and a voting error message is supplied to the queue of the input buffer 406 (step 1027). FIG. 11 shows a format of the voting error message. The collection flag 5101 and the data counters 5111, 5112, . . . , 511m for the voted {FC, RQN, DVN} are cleared to "0" (step 1026) and the process returns to the step 1011.

(iv) Edition

Figure 12:
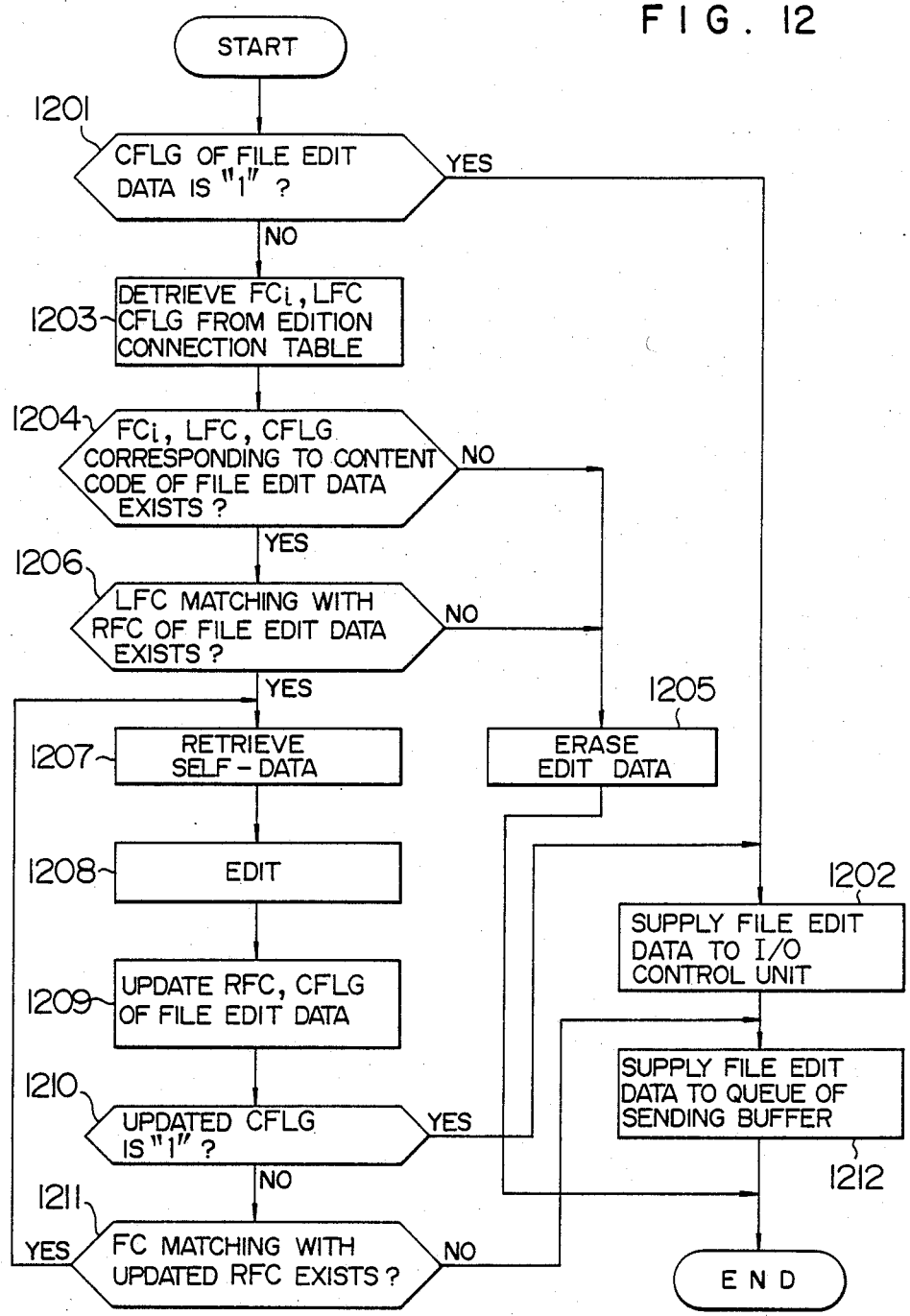
FIG. 12 shows a flow chart of a processing unit of the present invention.

The processing units 407 in the devices 11, 12, 13, 14, . . . , 1n read out the file edit data from the receiving buffers 402, one at a time, to edit them. FIG. 12 shows a flow chart of the processing unit 407 of the present invention. The edition. is now explained with reference to FIG. 12.

An edition end flag CFLG is read out of the file edit data to check whether it is "1" or not (step 1201). If it is "1", it means that the edition was completed and the data is supplied to the I/O control unit 409 for later output processing (step 1202). If it is "0", the following edit processing is carried out (step 1203~1212).

FIG. 13 shows an edition connecticn information table in the memory unit 408 for edition of the device. The memory unit 408 for edition contains the edition connection information table shown in FIG. 13. The edition connection information table includes the content code FCi of its own data Di to be connected to the content code FC of the file edition, that is, it indicates the content code of the data to be connected to the left of its own data Di. A left end connection information LFC and an edition end flag CFLG for indicating whether the file edition is completed by connecting its own data or not are included in the table. In the device which connects a plurality of own data for one file edition, a plurality of sets of information {FCi, LFC, CFLG} are registered for the content code of the file edition.

The processing unit 407 reads out the content code FC from the file edit data, retrives the information {FCi, LFC, CFLG} for the FC from all edition connection information tables. They are $\{FCi^1, LFC^1, CFLG^1\}, \{FCi^2, LFC^2, CFLG^2\}, \ldots, \{FCi^m, LFC^m, CFLG^m\}$ (step 1203). If there is no information for the FC (step 1204), the file edit data is erased (step 1205) and the process is terminated.

The right end content code RFC of the file edit data is sequentially compared with the left end connection information $LFC^1, LFC^2, \ldots, LFC^m$ to check whether matching LEC exists (step 1206). If there is no matching LFC, the file edit data is erased (step 1205) and the process is terminated. If there is matching LFC, it is defined as $LFC^n$. The self-data $Di^n$ to be connected is retrieved from the external memory device 30 by using the content code $FCi^n$ as a key (step 1207), it is connected to the right end of the edit data D of the file edit data (step 1208), and the right end content code RFC is updated by the content code $FCi^n$ of the connected data $Di^n$ and the edition end flag is updated by $CFLG^n$ (step 1209). Then, CFLG is checked to determine whether the edition has been completed by the above edition or not (step 1210). If the edition end flag CFLG is "1", the file edit data is supplied to the I/O control unit 409 (step 1202) and to the queue of the sending buffer 401 (step 1212). If the flag is "0" in the step 1210, the updated RFC is compared with $LFC^1, LFC^2, \ldots, LFC^m$ to check whether matching LFC exists (step 1211). If there is matching LFC, the step 1207 is carried out for that LFC, and the edition (step 1208) and the updating of RFC and CFLG (step 1209) are carried out. If there is no matching LFC in the step 1211, the file edit data is supplied to the queue of the sending buffer 401 (step 1212). The file edit data supplied to the queue of the sending buffer 401 in the step 1212 is sent to other devices by the data transmission control device 50 and edited by the processing unit 407 of the other devices. By repeating the above process, the file edition is completed.

When the voting error message is sent from the data consistency check unit 403, the data edition is not carried out and the message is sent to the I/O control unit 409 and the sending buffer 401.

Figure 17:
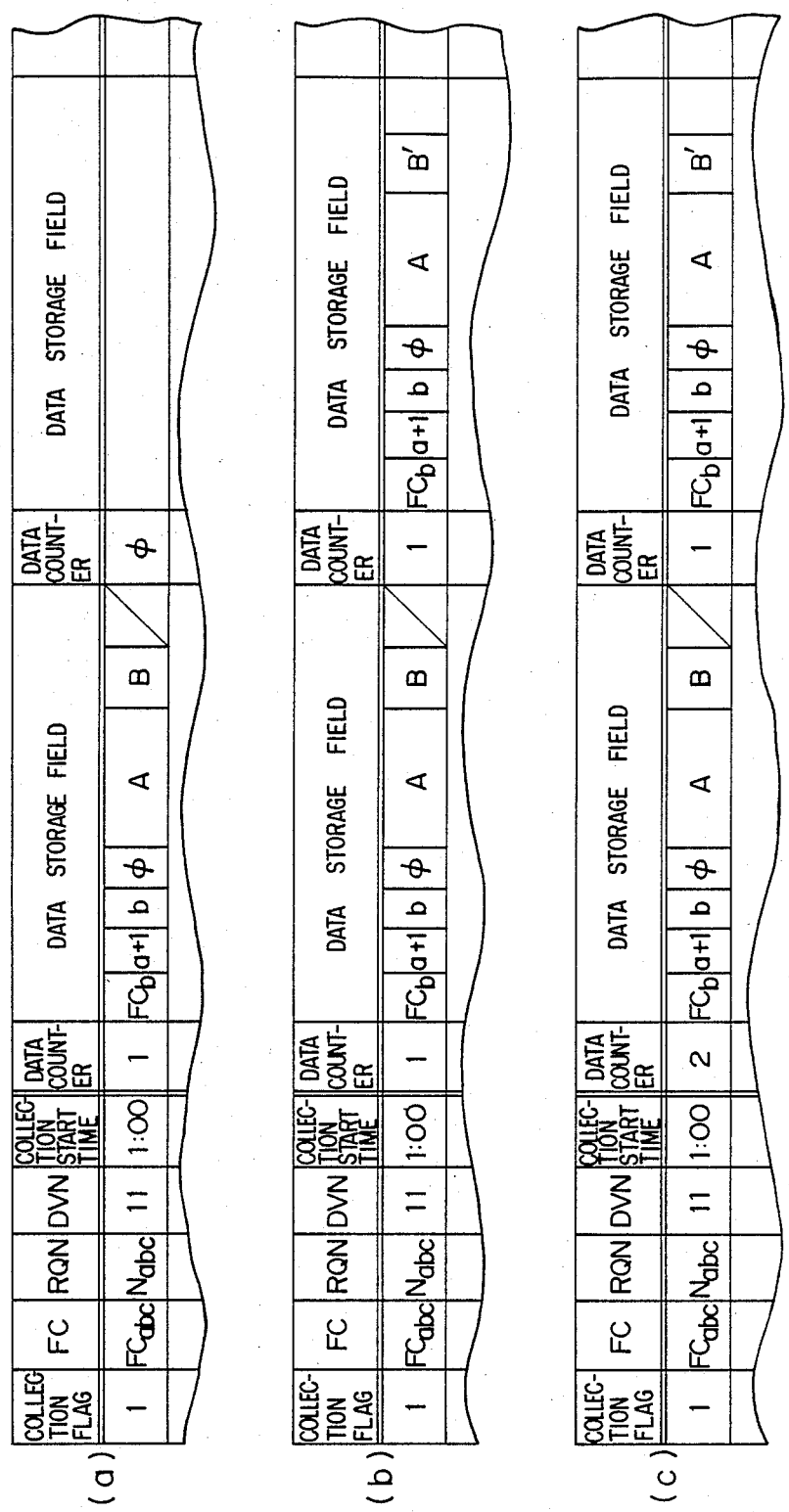

The process of data consistency check and file edition is now explained. FIGS. 14(a)~14(f) show formats of data areas of the file edit messages sent from the devices. FIG. 15 shows the consistency check data registration table for each device. FIG. 16 shows the edition connection information table for each device. FIG. 17 shows a status of the data consistency check work area for each device. The process of data consistency check and file edition is explained in detail with reference to FIGS. 14 to 17. In the file edition of the present embodiment, a file edit request to edit the data A and C stored in the devices 12 and 16 and the data B stored in duplicate in the devices 13, 14 and 15, in the order of files A, B and C is accepted by the device 11. The content code of the file edition is FCabc. Let us assume that the consistency check data registration tables 5011 in the memory units 405 for data consistency check in the devices 12, 13, 14, 15 and 16, and the edition connection information tables in the memory units 408 for edition contain the content codes FC as shown in FIGS. 15 an 16. It is also assumed that of the data B of the content code FCb stored in duplicate in the devices 12, 13 and 14, only the data stored in the device 13 has the data content B' ($\neq$B) stored therein.

The data area (those portions of the message other than F, FC, SA, DN) of the file edit message sent from the device 11 is formatted as shown in FIG. 14(a). This message is received by the devices 12, 13, 14, 15 and 16 and supplied to the data consistency check units 403 through the receiving buffer 402. In the process shown in FIG. 10, it is not checked for data consistency but supplied to the input buffer 406. Since {FCabc, FCs} has not been registered in the consistency check data registration table 5011, the processing unit 407 of the device edits the data in accordance with the flow shown in FIG. 12. Since FC has been registered in the edition connection information table as shown in FIG. 16, the data edition is carried out (step 1208) only in the device 12, and the message having the data area shown in FIG. 14(b) is sent out to the transmission line. This message is not checked for data consistency but the data is edited in the devices 13, 14 and 15. As a result, the messages having data areas shown in FIGS. 14(c), 14(d) and 14(e) are sent to the devices 13, 14 and 15, respectively. For those three redundant messages, the data consistency check and the edition are not carried out in the devices 11, 12, 13, 14 and 15. In the device 16, since FC=FCabc and RFC=FCb are registered in the consstency check data registration table 5011, the collection of the duplicate data and the voting are carried out in accordance with the flow shown in FIG. 10.

In the present embodiment, it is assumed that the device 16 receives the messages of FIGS. 14(c), 14(d) and 14(e) in this order. Status of the data consistency check work area 5012 are shown in FIGS. 17(a), 17(b) and 17(c). When the message of FIG. 14(c) is received, FC, RQN, DVN and collection start time are set and the collection flag is set. The edit data is stored in the data storage field and the data counter is set to "1" (FIG. 17(a)). When the message of 14(d) is received, since the data having matching FC, RQN and DVN is being collected, the right end data of the data area of FIG. 14(d) is compared with the right end data of the stored data of FIG. 14(c). Since the contents of the right end data are not equal, the data of FIG. 14(d) is stored in another storage field (FIG. 17(b)). When the message of FIG. 14(e) is received, since the data having matching FC, RQN and DVN is being collected and the data having matching right end data has been stored, the data counter for that field is incremented (FIG. 17(c)). After those three data have been collected, no further data is supplied and the voting is carried out. Three data have been collected, of which two have the content B and one has the content B'. Since the data of the content B is the majority, it is selected and sent to the processing unit 407. The processing unit 407 edits the data and the edition end message having the data area shown in FIG. 14(f) is sent from the device 16 to the transmission line.

(v) Outputting of edited data

It is assumed that in the device which outputs the edited data by the I/O device 20, the content codes of the edited data to be outputted have been registered in the content code registration table in the memory unit 501 for data transmission in the transmission control device 50, and the output content code registration table in the I/O memory unit 410. The I/O control unit 409 compares the content code of the file edit data supplied from the processing unit 407 with the output content code registration table 4102, and if there is matching data D, it supplies the matching data D to the I/O device 20.

It is assumed that the content code FCabc for the file edition has been registered in the content code registration table in the memory unit 501 for data transmission in the device ln and the output content code registration table 4102. The messages of FIGS. 14(a) to 14(e) are erased by the processing unit 407 (step 1205) but the message of FIG. 14(f) which has "1" edition end flag is supplied to the I/O control unit 409. Since the content code FCabc of this data has been registered in the output content code registration table 410, the I/O control unit 409 supplies the data area "ABC" to the I/O device 20 for display.

In the present embodiment, when information distributed in a plurality of devices are to be edited, each device can select correct data from the redundant edited data by its own decision even if the distributed information is duplicated. Accordingly even if a wrong edited data is sent out by an error in one device, the other devices can detect the error data when they receive the data to prevent the edit module from malfunctioning by the error data. Thus, the reliability of edition of the distributed files is significantly improved.

In accordance with the present invention, the redundant data generated in the course of cooperative processing by a plurality of devices connected to the common data transmission line are compared to select a correct data. Even if the data to be compared is gradually lengthened, the correct data can be selected without increasing the compare time.

We claim:

1. A method for editing information which is distributedly stored in memories of a plurality of devices connected to a common data transmission path, comprising the steps of:
   transmitting messages including edited information from a plurality of said devices to said common transmission path;
   collecting in at least one of said devices said messages transmitted from said plurality of devices;
   comparing in said at least one of said devices, data located at specific positions in said collected messages;
   selecting a correct message from said collected messages based on a result of the comparison;
   wherein said correct messages include messages which are not redundant.

2. A method for editing information according to claim 1, further comprising the steps of:
   adding information stored in the memory of said at least one of said devices to information of said selected correct message; and
   transmitting said selected correct message including said added information to said common transmission path as edited information.

3. A method for editing information according to claim 1, wherein said transmitted messages include a content code and said transmitted messages are stored in the device in which said content code is registered.

4. A method for editing information according to claim 1, wherein said data located at specific positions in said collected messages corresponds to right end data in said messages.

5. A method for editing information according to claim 1, wherein said data is collected within a predetermined time period.

6. A method for editing information according to claim 1, wherein said selecting steps includes the step of selecting majority data based on the comparison of said selected messages.

* * * * *